Dec. 29, 1925.
G. FORNACA
1,567,795
MOTOR CONTROLLING SYSTEM
Filed August 8, 1922
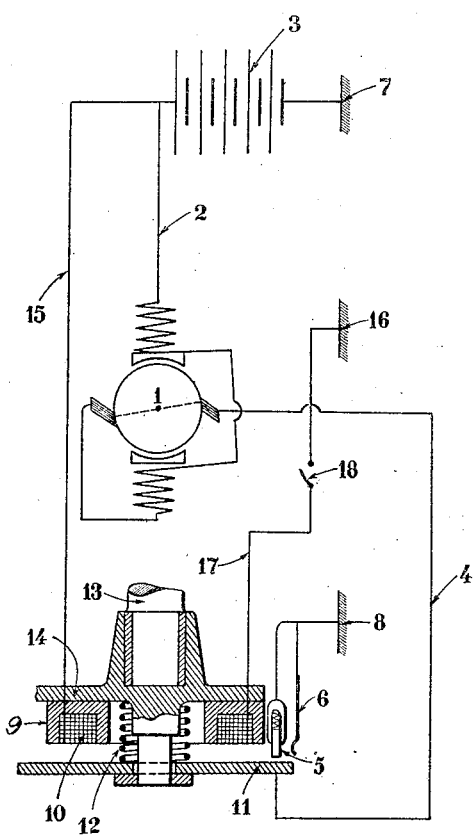

Patented Dec. 29, 1925.

1,567,795

UNITED STATES PATENT OFFICE.

GUIDO FORNACA, OF TURIN, ITALY.

MOTOR-CONTROLLING SYSTEM.

Application filed August 3, 1922. Serial No. 580,403.

*To all whom it may concern:*

Be it known that I, GUIDO FORNACA, a citizen of Italy, and residing at Turin, Italy, have invented certain new and useful Improvements in Motor-Controlling Systems, of which the following is a full, clear, and exact specification.

This invention relates to means for controlling at a distance direct current motors for starting automobile engines and has the characteristic feature that the motor is started by connecting one of the terminals with the earth or to a ground by means of an electro-magnet.

By this arrangement the connections are reduced and the device, owing to the special form of the relay, can be disposed within the motor casing, without noticeably increasing the size thereof.

The accompanying drawing shows by way of example a constructional form of this invention.

1 denotes a direct current motor with series excitation connected by the conductor 2 with a pole of the battery 3 and by the flexible conductor 4 with the insulated armature 11 of the relay. This relay consists of an electro-magnet 9, the core whereof is disk-shaped and is provided on one face with a circular groove containing a winding 10, and an armature 11 in the form of a flat disk, contiguous to the poles of the electro-magnet and held out of contact therewith by a spiral spring 12. In front of the armature and on the side of the electro-magnet are disposed a carbon contact 5, spring pressed outwardly and a yieldable contact 6, both grounded at 8, in such a way, that, when the armature 11 is attracted by the electro-magnet they successively engage the armature 11 and close the primary circuit, the battery being grounded with the other pole at 7. The relay thus formed is disposed concentric to the shaft 13 of the electric motor and is secured to the bearing 14 of said shaft on the collector side.

The winding 10 of the electro-magnet is connected by a conductor 15 with a pole of the battery and is grounded at 16 by means of a conductor 17. In this secondary circuit is inserted a switch 18 within easy reach of the driver.

In order to start the motor the switch 18 of the secondary circuit of the electro-magnet is closed; the battery therefore supplies the current to the winding 10 and the armature 11 is actively attracted by the electromagnet, thereby pressing on the carbon contact 5 of the primary circuit and engaging by its edge the contact 6, thus closing the circuit. When the switch 18 is opened, the action of the electro-magnet ceases and the armature 11 recedes owing to the action of the spring 12 and is released from the contacts 5 and 6, the primary circuit is broken and the battery current is not sent through the motor. The contact 6 preferably has a bevelled form as shown in the drawing, to facilitate the disengagement of the armature. As clearly shown in the drawing the flat shape of the relay allows same to be disposed within the motor casing without considerably increasing the size thereof.

Having described my invention, I declare that what I claim as new and desire to secure by Letters Patent is:

1. In a starting system for automobiles, a motor having a shaft, commutator and brushes and a bearing for said shaft, said bearing being formed with an outwardly projecting member in alignment with said shaft, an electromagnet mounted on said bearing and surrounding said projecting member, an armature for said electromagnet consisting of a circular metal disc loosely mounted on said projecting member, a spring interposed between said bearing and disc, a source of power having one side grounded and the other side connected to one of said brushes and a flexible conductor connecting another of said brushes with said disc, and a yielding grounded contact adapted to be engaged by said disc when the same is attracted by said electromagnet.

2. In a starting system for automobiles, a motor having a shaft, commutator and brushes and a bearing for said shaft adjacent said commutator, said bearing being formed with an outwardly projecting member in alignment with said shaft, an electromagnet mounted on said bearing and surrounding said projecting member, an armature for said electromagnet consisting of a circular disc loosely mounted on said projecting member, a spring interposed between said bearing and disc, a source of power having one side grounded and the other side connected to one of said brushes, a flexible conductor connecting another to said brushes with said disc, a yielding grounded carbon contact adapted to be engaged by the face of said disc when said disc is attracted by said electromagnet, and a yielding grounded contact adapted to be engaged by the edge of said disc subsequently to the engagement of said carbon contact.

3. The combination with an electric motor of a controlling device therefor comprising a support formed with an outwardly projecting member, an electromagnet mounted on said support and surrounding said member, an armature for said electromagnet consisting of a circular disc loosely mounted on said projecting member, a spring interposed between said support and disc, a yielding carbon contact adapted to be engaged by the face of said disc when said disc is attracted by said electromagnet, a yielding contact adapted to be engaged by the edge of said disc subsequently to the engagement of said carbon contact, said contact being formed so as to assist said spring in throwing said disc out of engagement with said carbon contact when said disc is released by said electromagnet.

In witness whereof, I have hereunto signed my name.

GUIDO FORNACA.